(12) United States Patent
Hyde et al.

(10) Patent No.: US 10,020,894 B2
(45) Date of Patent: *Jul. 10, 2018

(54) SYSTEMS AND METHODS FOR TRANSMITTING ROUTABLE OPTICAL ENERGY PACKETS

(71) Applicant: Elwha LLC, Bellevue, WA (US)

(72) Inventors: Roderick A. Hyde, Redmond, WA (US); Edward K. Y. Jung, Bellevue, WA (US)

(73) Assignee: Elwha LLC, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/659,255

(22) Filed: Jul. 25, 2017

(65) Prior Publication Data

US 2017/0324483 A1 Nov. 9, 2017

Related U.S. Application Data

(63) Continuation of application No. 15/294,284, filed on Oct. 14, 2016, now Pat. No. 9,722,709, which is a continuation of application No. 14/069,058, filed on Oct. 31, 2013, now Pat. No. 9,490,912.

(51) Int. Cl.
| | |
|---|---|
| *H04B 10/00* | (2013.01) |
| *H04B 10/80* | (2013.01) |
| *H04B 10/564* | (2013.01) |
| *H04Q 11/00* | (2006.01) |
| *H04B 10/54* | (2013.01) |

(52) U.S. Cl.
CPC ......... *H04B 10/807* (2013.01); *H04B 10/564* (2013.01); *H04Q 11/0005* (2013.01); *H04Q 11/0062* (2013.01); *H04Q 11/0066* (2013.01); *H04B 10/54* (2013.01); *H04Q 2011/002* (2013.01); *H04Q 2011/0039* (2013.01); *H04Q 2011/0073* (2013.01)

(58) Field of Classification Search
CPC .. H04B 10/807; H04B 10/11; H04B 10/2575; H04J 14/02; H04J 14/0212; H04J 14/0258; H04J 14/0269; H04Q 11/0066; H04Q 11/0005
USPC ..... 398/171, 118, 119, 128, 130, 45, 48, 49, 398/51, 54, 57, 79, 68, 66, 72, 47, 158, 398/159; 370/352, 392, 389, 535, 225, 370/228
See application file for complete search history.

(56) References Cited

U.S. PATENT DOCUMENTS

| | | | |
|---|---|---|---|
| 4,905,309 A | 2/1990 | Maisonneuve et al. | |
| 4,998,294 A | 3/1991 | Banks et al. | |
| 5,796,890 A | 8/1998 | Tsuji et al. | |
| 6,141,763 A | 10/2000 | Smith et al. | |
| 6,816,639 B1 | 11/2004 | Leonczuk et al. | |

(Continued)

*Primary Examiner* — Hanh Phan
(74) *Attorney, Agent, or Firm* — Foley & Lardner LLP

(57) ABSTRACT

A system for transmitting routable energy packets includes an optical power source and a processing circuit. The optical power source is configured to generate an optical power packet having optical energy, generate an optical data packet comprising routing information configured to control a route of the optical power packet, and transmit the optical power packet and the optical data packet via a conduit. The processing circuit is configured to generate the routing information to be transmitted within the optical data packet, and control a transmission by the optical power source.

35 Claims, 8 Drawing Sheets

(56) References Cited

U.S. PATENT DOCUMENTS

| | | |
|---|---|---|
| 6,987,900 B2 | 1/2006 | Leonczuk et al. |
| 7,068,991 B2 | 6/2006 | Parise |
| 7,072,588 B2 | 7/2006 | Skinner |
| 7,177,544 B1 * | 2/2007 | Wada .................. H04L 45/00 398/51 |
| 7,263,245 B2 | 8/2007 | Delcher et al. |
| 7,356,209 B2 | 4/2008 | Delcher et al. |
| 7,359,647 B1 | 4/2008 | Faria et al. |
| 7,638,750 B2 | 12/2009 | Kline |
| 7,844,154 B2 | 11/2010 | Bookbinder et al. |
| 7,859,071 B2 | 12/2010 | Levinson |
| 7,941,022 B1 | 5/2011 | Schaffner et al. |
| 8,855,499 B2 * | 10/2014 | Sokolov .................. H04J 14/02 398/171 |
| 9,490,912 B2 * | 11/2016 | Hyde .................... H04B 10/807 |
| 9,722,709 B2 * | 8/2017 | Hyde .................... H04B 10/807 |
| 2004/0264843 A1 | 12/2004 | Leonczuk et al. |
| 2006/0202109 A1 | 9/2006 | Delcher et al. |
| 2006/0222302 A1 | 10/2006 | Levinson |
| 2007/0257186 A1 | 11/2007 | Delcher et al. |
| 2008/0277565 A1 | 11/2008 | Bookbinder et al. |
| 2010/0012819 A1 | 1/2010 | Graham |
| 2010/0014867 A1 | 1/2010 | Ramanitra et al. |
| 2010/0078995 A1 | 4/2010 | Hyde et al. |
| 2010/0079010 A1 | 4/2010 | Hyde et al. |
| 2010/0295372 A1 | 11/2010 | Hyde et al. |
| 2011/0278440 A1 | 11/2011 | Chan et al. |
| 2011/0278479 A1 | 11/2011 | Chan et al. |
| 2011/0278480 A1 | 11/2011 | Chan et al. |
| 2011/0278481 A1 | 11/2011 | Chan et al. |
| 2011/0279882 A1 | 11/2011 | Chan et al. |
| 2011/0280576 A1 | 11/2011 | Chan et al. |
| 2011/0280577 A1 | 11/2011 | Chan et al. |
| 2011/0280583 A1 | 11/2011 | Chan et al. |
| 2011/0280586 A1 * | 11/2011 | Chan .................... H04B 10/807 398/200 |
| 2011/0286748 A1 | 11/2011 | Davidson et al. |

* cited by examiner

SYSTEMS AND METHODS FOR TRANSMITTING ROUTABLE OPTICAL ENERGY PACKETS

CROSS-REFERENCE TO RELATED PATENT APPLICATIONS

This application is a continuation of U.S. patent application Ser. No. 15/294,284, filed Oct. 14, 2016, entitled "SYSTEMS AND METHODS FOR TRANSMITTING ROUTABLE OPTICAL ENERGY PACKETS," which is a continuation of U.S. patent application Ser. No. 14/069,058, filed Oct. 31, 2013, entitled "SYSTEMS AND METHODS FOR TRANSMITTING ROUTABLE OPTICAL ENERGY PACKETS," each of which are incorporated herein by reference in their entireties and for all purposes.

BACKGROUND

Optical power is conventionally transmitted via conduit such as optical fiber. Optical fiber allows for the transmission of optical power over relatively large distances without excessive power losses. It is also possible to transmit optical power via free space. Such transmitted optical power may be delivered to power remote devices. For example, optical power may be generated from a power source, transmitted via a conduit to a remote device, and then converted to electrical power by the remote device for further use.

SUMMARY

One embodiment relates to a system for transmitting routable energy packets. The system includes an optical power source configured to generate an optical power packet having optical energy, generate an optical data packet comprising routing information configured to control a route of the optical power packet, and transmit the optical power packet and the optical data packet via a conduit such that the optical power packet and the optical data packet are co-propagating. The system further includes a processing circuit configured to generate the routing information to be transmitted within the optical data packet, and control a transmission by the optical power source.

Another embodiment relates to a method of transmitting routable energy packets. The method includes generating, with an optical power source, an optical power packet having optical energy, generating routing information configured to control a route of the optical power packet, generating an optical data packet comprising the routing information, and transmitting the optical power packet and the optical data packet via a conduit such that the optical power packet and the optical data packet are co-propagating.

Another embodiment relates to a non-transitory computer-readable medium having instructions stored thereon, that when executed by a computing device cause the computing device to perform operations for transmitting routable energy packets. The operations include generating, with an optical power source, an optical power packet having optical energy, generating routing information configured to control a route of the optical power packet, generating an optical data packet comprising the routing information, and transmitting the optical power packet and the optical data packet via a conduit such that the optical power packet and the optical data packet are co-propagating.

Another embodiment relates to a system for transmitting routable energy packets. The system includes an optical power source configured to generate an optical power packet having optical energy, generate an optical data packet comprising identification information identifies a source and a recipient of the optical power packet, and transmit the optical power packet and the optical data packet via a conduit such that the optical power packet and the optical data packet are co-propagating. The system further includes a processing circuit configured to generate the identification information to be transmitted within the optical data packet, and control a transmission by the optical power source.

Another embodiment relates to a method of transmitting routable energy packets. The method includes generating, with an optical power source, an optical power packet having optical energy, generating identification information identifies a source and a recipient of the optical power packet, generating an optical data packet comprising the identification information, and transmitting the optical power packet and the optical data packet via a conduit such that the optical power packet and the optical data packet are co-propagating.

Another embodiment relates to a non-transitory computer-readable medium having instructions stored thereon, that when executed by a computing device cause the computing device to perform operations for transmitting routable energy packets. The operations include generating, with an optical power source, an optical power packet having optical energy, generating identification information identifies a source and a recipient of the optical power packet, generating an optical data packet comprising identification information, and transmitting the optical power packet and the optical data packet via a conduit such that the optical power packet and the optical data packet are co-propagating.

Another embodiment relates to a system for routing energy packets, including a router device and a processing circuit. The routing device is configured to receive, via a conduit, an optical power packet having optical energy. The routing device is further configured to receive, via the conduit, a co-propagating optical data packet comprising routing information. The routing device is further configured to route the optical power packet. The processing circuit is configured to analyze the routing information of the optical data packet, and control routing of the router device such that the optical power packet is transmitted based on the routing information.

Another embodiment relates to a method of routing energy packets. The method includes receiving, at a router device, an optical power packet having optical energy. The method further includes receiving, at the router device, a co-propagating optical data packet comprising routing information. The method further includes analyzing the routing information of the optical data packet, and routing the optical power packet based on the routing information.

Another embodiment relates to a non-transitory computer-readable medium having instructions stored thereon, that when executed by a computing device cause the computing device to perform operations for routing energy packets, the operations include analyzing routing information of a received optical data packet, where the optical data packet comprises the routing information, and where the optical data packet was received by a router device. The operations further include routing, using the router device, an optical power packet having optical energy, where the optical power packet was co-propagating the optical data packet and received by the router device, and where the optical power packet is routed based on the routing information.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
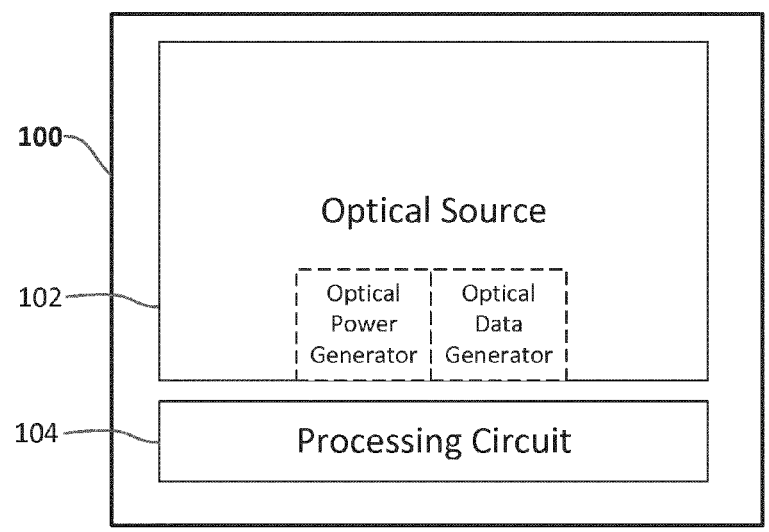
FIG. 1 is a block diagram of a system for transmitting routable energy packets according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, various embodiments of systems and methods for routable optical energy packets are shown and described. Electrical power may be generated by a power source and converted to an optical power signal for transmission via an optical conduit (e.g., optical fiber, free-space, etc.). For example, a vertical cavity surface emitting laser (VCSEL) or an edge-emitting (in-plane) laser may generate optical power to be transmitted to a receiving device. Other devices may also be utilized to generate optical power signals, and the scope of the present disclosure is not limited to a particular type of optical power source. Upon reception of an optical power signal, a receiving device may convert the optical power into electricity for further use or storage. For example, the receiver may utilize a photovoltaic converter for optical to electrical power conversion. Transmission of optical power to a receiving device may be enhanced by packeting the optical power signals (e.g., packets or pulses of optical energy) and by using optical data packets that are transmitted along with packeted optical power signals, as will described in further detail herein. The optical data packets may contain routing information to allow for control of the destination and/or transmission path of corresponding optical power packets. The optical data packets may further contain information that specifies various characteristics of the optical power signal. For example, such information may specify the amount of energy being transmitted, a time and/or energy profile of the signal, the polarization of the signal, the phase of the signal, the frequency of the signal, etc. The optical data packets may also specify pricing information related to the optical power. Additionally, the optical data packets may identify a number of optical power packets being transmitted, the source that provided the optical power, an intermediate device that re-transmitted the optical power, and/or a recipient (or multiple recipients) of the optical power. In general, the optical data packets facilitate the routing of packeted optical power throughout an optical network. A processing circuit may be used to control an optical source and control the generation (and transmission) of the optical power packets and the optical data packets. In any of the embodiments discussed herein, the optical power generated by the power source may be transmitted as discrete energy packets or as a continuous optical pulse having certain portions of the pulse that correspond to packets (i.e. virtual packets).

Referring to FIG. 1, a block diagram of system 100 for transmitting routable energy packets is shown. According to one embodiment, system 100 includes optical source 102 and processing circuit 104. Optical source 102 includes all components necessary to generate and transmit an optical power signal and an optical data signal. For example, optical source 102 may include various electrical to optical converters that are configured to be controlled by processing circuit 104. In one embodiment, optical source 102 includes a VCSEL device. In another embodiment, optical source 102 includes an array of VCSEL devices. In another embodiment, optical source 102 includes an LED device. In another embodiment, optical source 102 includes a laser diode device. Processing circuit 104 is generally configured to control optical source 102 such that optical source 102 outputs packeted optical power signals via a conduit. The optical power signals may be formed as discrete packets or virtual packets of a continuous pulse. Optical source 102 is further configured to generate optical data packets to be transmitted with the optical power signal (e.g., a copropagating signal, etc.). Optical source 102 may include separate optical devices configured to generate the optical data signal, or an optical power and optical data signal may be generated by the same device. In one embodiment, system 100 includes optical source 102 configured to generate an optical power signal, and an additional optical source 102 configured to generate an optical data signal. Processing circuit 104 generates the data to be transmitted via the optical data packets and controls and synchronizes the transmission of optical power and optical data, as will be described further herein. Optical source 102 may be configured to transmit optical power signals and optical data signals over various different types of conduit, including optical fiber, protonic crystal fiber, hole fiber, optical waveguide, plasmatic waveguide, free space, gas-filled conduit, and the like. Such conduit may include portions of optical fiber and free space. Optical source 102 may also be configured to transmit the optical power signals and optical data signals over the same portion of a conduit, or through different spatial regions within the conduit.

In general, an optical fiber or functional equivalent may be used for conveying optical power from optical source 102 or an intermediate distribution point to at least one location where it is to be routed, retransmitted, and/or converted into electrical, thermal, and/or chemical power and then used to energize an electrical load (e.g., via photovoltaic conversion at the electrical load), a thermal load (e.g., via absorption in a heat engine), and/or a chemical load (e.g., via photodissociation of a chemical species). Optical power signals and optical data signals of differing frequencies, polarities, phase, spatial mode, physical spacing, power level, etc., may be generated by optical source 102 to allow simultaneous transmission of multiple signals. In one embodiment, multiple optical power signals may generated to correspond to an electrically complex (e.g., AC, polyphase, etc.) signal.

Figure 2:
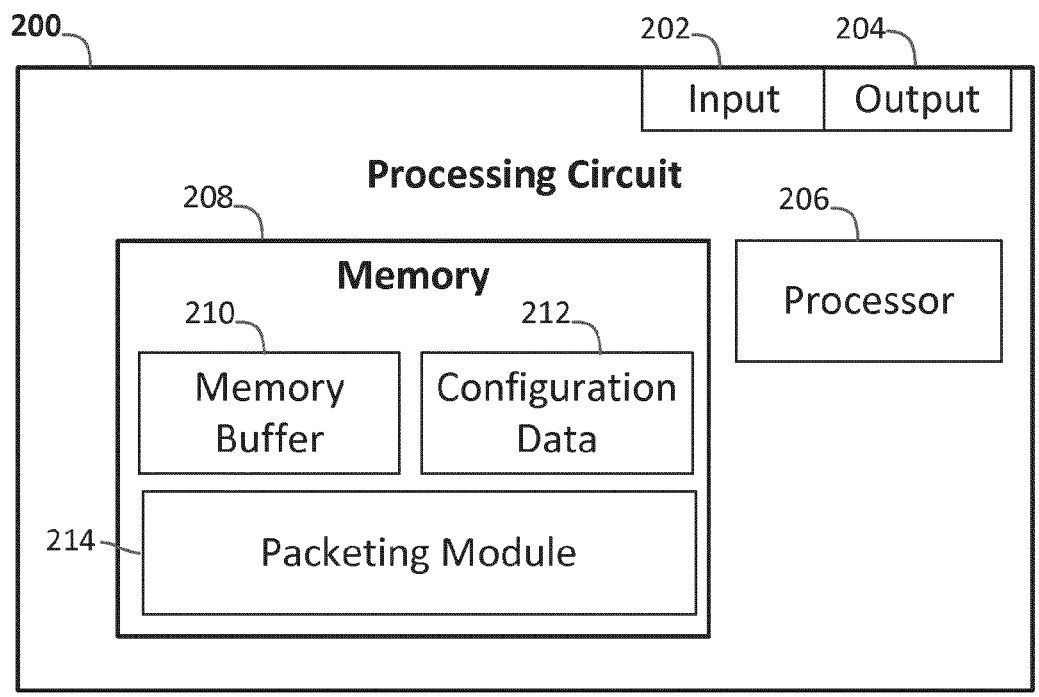
FIG. 2 is a block diagram of a processing circuit according to one embodiment.

Referring to FIG. 2, a detailed block diagram of processing circuit 200 for completing the systems and methods of the present disclosure is shown according to one embodiment. Processing circuit 200 is generally configured to interface with and control an optical source (or multiple optical sources) such that an optical power signal and an optical data are packeted and transmitted. Processing circuit 200 is further configured to generate data to be transmitted via an optical data packet. The data may include routing information configured to control a route of a cotransmitted optical power packet. The data may also include identification information that identifies a source and/or at least one recipient of the optical power packet. The data may also specify pricing information related to optical power delivery. Processing circuit 200 is further configured to receive configuration data and other input data. Input data may be accepted continuously or periodically. As an example, configuration data may be used by processing circuit 200 to set various operating settings of processing circuit 200 and any corresponding optical sources. As another example, processing circuit 200 may use input data to receive feedback from optical sources, which then may be used to monitor and maintain a status regarding the optical sources. Processing circuit 200 may also format input data for transmission via an optical data packet. Processing circuit 200 may also generate reporting data related to a transmission. In controlling an optical source and generating packet data, processing circuit 200 may make use of machine learning, artificial intelligence, interactions with databases and database table lookups, pattern recognition and logging, intelligent control, neural networks, fuzzy logic, etc. Processing circuit 200 further includes input 202 and output 204. Input 202 is configured to accept a data stream (e.g., a digital or analog stream of data) and any configuration information. Output 204 is configured to output data to components of the systems as described herein.

According to one embodiment, processing circuit 200 includes processor 206. Processor 206 may be implemented as a general-purpose processor, an application specific integrated circuit (ASIC), one or more field programmable gate arrays (FPGAs), a digital-signal-processor (DSP), a group of processing components, or other suitable electronic processing components. Processing circuit 200 also includes memory 208. Memory 208 is one or more devices (e.g., RAM, ROM, Flash Memory, hard disk storage, etc.) for storing data and/or computer code for facilitating the various processes described herein. Memory 208 may be or include non-transient volatile memory or non-volatile memory. Memory 208 may include database components, object code components, script components, or any other type of information structure for supporting the various activities and information structures described herein. Memory 208 may be communicably connected to processor 206 and include computer code or instructions for executing the processes described herein (e.g., the processes shown in FIGS. 5-8). Memory 208 includes memory buffer 210. Memory buffer 210 is configured to receive a data stream from an optical source. For example, the data may include a real-time stream of feedback or status data related to an optical transmission. Memory buffer 210 is further configured to receive a data stream from an external data source (e.g., a pricing database, a destination/routing database, a configuration database, etc.). The data received through input 202 may be stored in memory buffer 210 until memory buffer 210 is accessed for data by the various modules of memory 208. For example, packeting module 214 can access the data that is stored in memory buffer 210. The data received through input 202 may also be immediately accessed by the various components of processing circuit 200.

Memory 208 further includes configuration data 212. Configuration data 212 includes data related to processing circuit 200. For example, configuration data 212 may include information related to interfacing with other components (e.g., sensors, transmitters, networking interfaces, power sources, etc.). Configuration data 212 also may include the command set needed to interface with a computer system used configure a system including processing circuit 200. Based on data stored in configuration data 212, processing circuit 200 may format data for output via output 204, which may include forming data into packets for transmission, etc. Configuration data 212 may include default values required to initiate communication with an optical power source. Configuration data 212 further includes data to configure communication between the various components of processing circuit 200.

Memory 208 further includes packeting module 214. Packeting module 214 is configured to receive configuration information and other data as provided by processing circuit 200. Packeting module 214 generates the signals necessary to control an optical source such that an optical power signal is generated and packeted into an optical power packet. Packeting module 214 also generates the signals necessary to control the optical source such corresponding control and/or identification data are packeted into an optical data packet, which is transmitted along with the optical power packet. This includes generating the signals and transmitting appropriate data to the optical source (or multiple optical sources). Packeting module 214 is configured to control both the optical power and optical data generating components of an optical source. Packeting module 214 further generates the data (and/or acquires the data) to be included in the optical data packet.

In one embodiment, packeting module 214 controls an optical source (e.g., optical source 102 of FIG. 1) such that an optical power signal is transmitted along with a copropagating optical data packet, where the optical data packet is configured to control the routing of the optical data signal. Packeting module 214 generates the data to be included in the optical data packet, which includes routing information. The routing information can be configured according to various routing protocols. For example, the routing information may include node-by-node switching instructions. This enables routers, switches, and other network nodes along the path from the optical source to a destination to precisely control the cotransmitted optical power signal. The routing information may include a single destination address or multiple destination addresses, and an address may correspond to both the optical power and data packets, or the address may corresponding to a specific optical power packet or optical data packet. The routing information may include instructions to apply a time delay to the optical power or data packet (e.g., by temporarily storing it in an optical delay line such as an optical fiber loop or a mirror-folded beampath, or within a high-index artificial or natural material).

In one embodiment, packeting module 214 generates routing information that describes the energy to be delivered along the route by a corresponding optical power packet. As such, the routing information may identify the amount of energy that is included in the optical power packet. The routing information may specify that a certain amount of optical power is to be delivered to a specific destination node, or it may specify amounts of optical power to be delivered to multiple nodes along the route. The routing information may further describe the time and power profile of the optical power packet. Other characteristics of the optical power packet may also be described by the routing information, including polarization, phase, and frequency characteristics of the optical power. The routing information may also precisely describe how the corresponding optical power packet should be converted to electrical power. The routing information may specify an allowable amount of propagation loss (e.g., due to absorption and/or switching) during delivery of the optical power packet. The routing information may also provide instructions as to an amount of optical energy to be added (e.g., at a node, along the conduit, etc.) to the optical power packet to compensate for such propagation losses. The routing information may also provide instructions as to an amount of optical energy that must be transmitted onwards, and the amount of optical energy to be added may be calculated based on the required optical energy transmission amount. For example, if the optical energy of a packet is less than a minimum required amount of energy to be transmitted onward (as specified by the routing information), additional optical energy may be added.

In one embodiment, packeting module 214 generates routing information that identifies the price of a specific optical power packet, a group of optical power packets, or a general optical power price rate. For example, the pricing information may specify that the price of optical power is a certain amount per joule. As another example, the pricing information may specify that the price of optical power is a certain amount per optical power packet. The pricing information may also specify different prices for different nodes along a transmission route (e.g., a first receiving device may be required to pay a first price rate, and a second receiving device may be required to pay a second price rate). In one embodiment, routing instructions may be linked to the pricing information. In this manner, a routing device may route an optical power packet to a first destination that is willing to pay a first price for the optical power or to a second destination that is willing to pay a second price for the optical power.

In one embodiment, packeting module 214 is configured to control the optical source such that an optical data packet is embedded within the optical power signal. For example, packeting module 214 may cause the optical source to encode an optical data packet on the optical power energy beam corresponding to an optical power packet. In this manner, the optical data packet may be manifested as an intensity or phase modulation. As another example, the optical data packet may be cotransmitted as a distinct pulse along with the optical power packet. The optical power energy beam and optical data packet may be structured to differ in mode structure, wavelength, polarization, phase, optical bandwidth, etc. The aforementioned differences allow an optical data packet to be distinguished from the optical power energy beam of an optical power packet.

Optical power packets and optical data packets may be transmitted according to various configurations. In one embodiment, packeting module 214 controls an optical source such that optical data packets are time-separated from the optical power packets. For example, an optical data packet may be sent ahead or behind an optical power packet (or group of optical power packets). As another example optical data packets may be sequentially interspersed between corresponding optical power packets. As another example, duplicate optical data packets may be redundantly interspersed throughout a single energy pulse of an optical power packet. As another example, optical data of an optical data packet may be embedded at various locations throughout a pulse.

In one embodiment, packeting module 214 generates identification information to be included in an optical data packet. The identification information is identifies the source or recipient (or both) of corresponding optical power packets. For example the identification information of an optical data packet may include a specific source identification code, or a recipient identification code. As another example, the identification information of an optical data packet includes a source address or a recipient address of a destination on an optical network. This configuration may allow for multiple optical power providers to transmit optical power over an optical network. For example, each provider may include other various identifiers in the optical data packet that allow nodes along the optical network to establish which optical power packets came from which provider. The identification information of an optical data packet may further specify whom to pay for a received optical power packet, which may or may not be the original source of the optical power packet. For example, if the optical power packet was rerouted by an intermediate device, the identification information may specify that an operator of the intermediate device should receive payment). Such payment information may include information necessary to initiate a payment upon receipt (e.g., bank information, account information, etc.).

In any of the embodiments discussed herein, optical power may be transmitted in discrete energy packets that have a single corresponding data packet or multiple corresponding data packets. For example, each optical power packet may have its own accompanying optical data packet. Alternatively, an optical power packet may have multiple accompanying data packets to allow for redundancy. In another configuration, a single data packet may contain information for N optical power packets. Also, as discussed above, optical power may be transmitted as virtual packets. For example, a continuous energy pulse may be generated by the optical source and the energy pulse may be cotransmitted with optical data packets that correspond to defined amounts of the continuous energy pulse. Additional virtual data packets may also be transmitted based on the defined amounts of energy. For example, a data packet may be transmitted for every K joules of optical energy, where each K joules of energy represents a virtual power packet. In some embodiments, optical power packets, discrete or virtual, may be identically structured and differ only in their corresponding optical data packets. Alternatively, optical power packets may differ in characteristics such as frequency, phase, spatial mode, power level, group velocity, etc. In this manner, packeting module 214 may control the transmission of optical power packets such that the optical power packets are superimposed but can be distinguished by a receiving device (e.g., a network node, a routing device, etc.).

Packeting module 214 may also control the transmission of optical power packets such that they are dispersion compensated. In this manner, a group of optical power packets may be structured to travel at a stable group velocity. In one embodiment, packeting module 214 controls the transmission of optical data packets such that the data packets copropagate at the same group velocity as their corresponding optical power packets. Packeting module 214 may also control an optical source so that that either the optical power packets or optical data packets propagate as solitons through a conduit.

In one embodiment, packeting module 214 is configured to implement security mechanisms related to the data to be transmitted via an optical data packet. For example, the data may be encrypted according to the Advanced Encryption Standard (AES), the optical data packet may be formatted according to an Encapsulating Security Payload (ESP) format, or the optical data packet may include a message authentication code, etc. In one embodiment, packeting module 214 is configured to encode the optical data packets to allow for error detection and correction of the data of the packet. For example, an optical data packet may include an error-correcting code or parity data, etc. Other encryption mechanisms and error correction and detection mechanism are also envisioned.

It should be understood that any combination of the data discussed herein may be included in an optical data packet. For example, an optical data packet may describe the energy to be delivered along a route, provide pricing information, and provide node-by-node routing information including a source and destination address.

Figure 3:
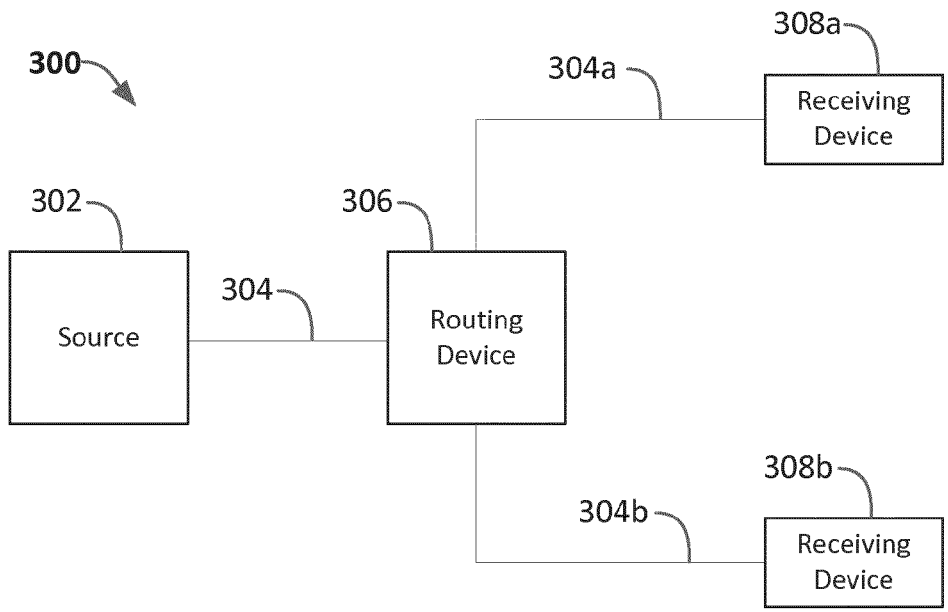
FIG. 3 is a schematic diagram of a network for transmitting routable energy packets according to one embodiment.

Referring to FIG. 3, network 300 for transmitting routable energy packets is shown according to one embodiment. Network 300 includes optical power and data source 302 (e.g., system 100 in FIG. 1). Optical power and data source 302 is coupled to conduit 304, which may be any of the optical conduits as described herein. Network 300 further includes routing device 306 and receiving devices 308a and 308b. Optical power and data source 302 generates optical power packets (e.g., optical power packets A and B) to be transmitted to receiving devices 308a and 308b, respectively, and includes routing information within optical data packets A and B corresponding to the optical power packets. For example, optical data packet A may include routing information that causes routing device 306 to switch its corresponding optical power packet through branch 304a. Similarly, optical data packet B may include routing information that causes routing device 306 to switch its corresponding optical power packet through branch 304b. In this manner, the routing information of the optical data packets instructs routing device 306 where to route an optical power packet.

Routing device 306 may also use some of the energy of a received optical power. For example, a certain amount of energy may be used to power any of the components of routing device 306. Routing device 306 may determine to pass through an optical power packet and/or an optical data packet on their originally intended routes (e.g., no rerouting is applied by routing device 306). Routing device 306 may also edit any of the information of an optical data packet. For example, routing device 306 edit routing information of the optical data packet such that the optical data packet and/or corresponding optical power packet are rerouted to a destination/address that is different than what is specified by the routing information. In one embodiment, routing device 306 includes components (e.g., an optical power source) configured to increase the energy of an optical power packet. The boost in energy may be applied to compensate for absorption or switching losses that occurred during transmission, or to compensate for predicted losses. The specific amount of energy to be added may be determined by a processing circuit of routing device 306 (e.g., processing circuit 200 of FIG. 2 may be configured to control routing device 306) based on the energy level of the optical power packet and/or knowledge of the route of the optical power packet. The amount of energy to be added may also be based on a configuration setting of the routing device. The amount of energy to be added can also be specified by the routing information. In one embodiment, routing device 306 includes components configured to delay routing of an optical power packet and/or optical data packet. For example, the optical power packet and/or optical data packet may be temporarily stored in an optical storage device (e.g., an optical fiber loop, a mirror-folded beampath, a high-index artificial or natural material, etc.) before being transmitted.

The optical data packets may also each include identification information, allowing receiving devices 308a and 308b to identify that source 302 provided the optical power. The optical data packets may each include information that instructs receiving devices 308a and 308b to convert the corresponding optical power packets to electrical power signals of a certain voltage/amperage, phase, frequency, etc. Additionally, pricing information may be included so that receiving devices 308a and 308b can appropriately pay for receiving optical power. Alternatively, routing device 306 may pay for optical power from source 302, and then distribute the optical power as a reseller. It should be understood that the scope of the present disclosure is not limited to embodiments including a certain number of routing devices or receiving devices, and an optical network may have any number of nodes. In an embodiment utilizing multiple routing devices or intermediate nodes, routing information may include node-by-node switching instructions.

Figure 4:
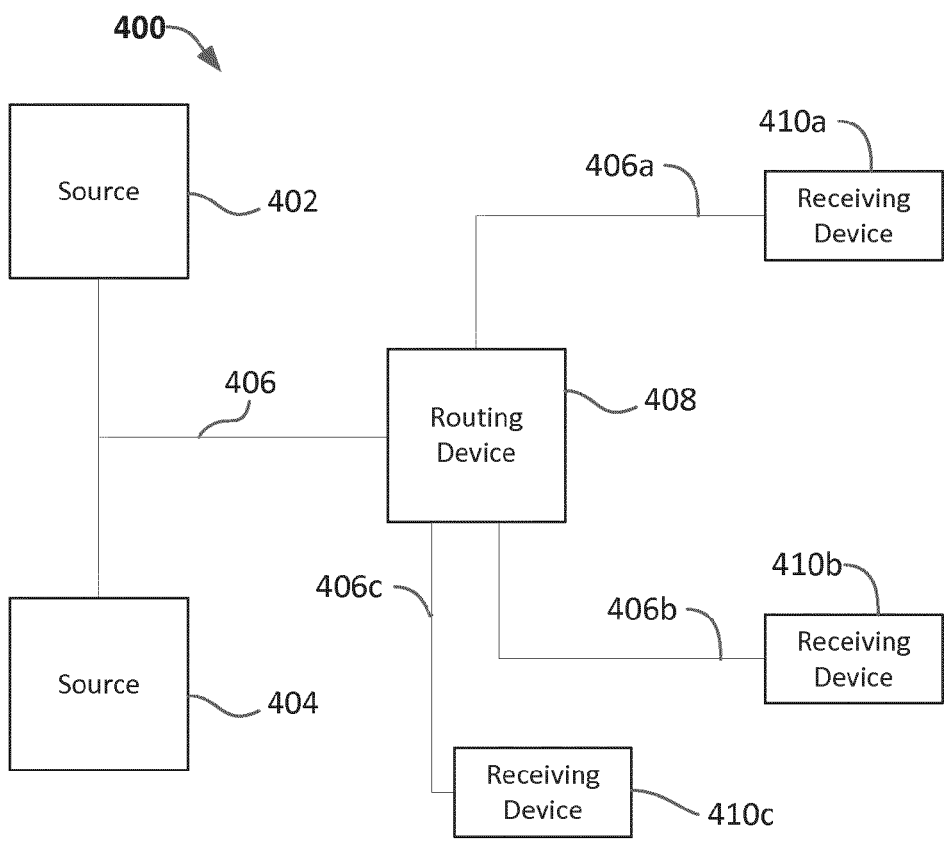
FIG. 4 is a schematic diagram of a network for transmitting routable energy packets according to one embodiment.

Referring to FIG. 4, network 400 for transmitting routable energy packets is shown according to one embodiment. Network 400 includes optical power and data sources 402 and 404. Optical power and data sources 402 and 404 are coupled to conduit 406. Optical power and data sources 402 and 404 may be configured to transmit optical power and data such that optical power and data from each source may be distinguished as described herein. Network 400 further includes routing device 408 and receiving devices 408a, 408b, and 408c. Routing device 408 may be configured as routing device 306 of FIG. 3. Optical power and data source 402 generates optical power packets (e.g., optical power packets $A_1$ and B) to be transmitted to receiving devices 410a and 410b, respectively, and includes routing information within corresponding optical data packets $A_1$ and B. For example, optical data packet $A_1$ may include routing information that instructs routing device 408 to switch optical power packet $A_1$ through network branch 406a. Similarly, optical data packet B may include routing information that causes routing device 408 to switch an optical power packet B through branch 406b. Optical power and data source 404 generates optical power packets (e.g., optical data packets $A_2$ and C) to be transmitted to receiving devices 410a and 410c, respectively, and includes routing information within corresponding optical data packets $A_2$ and C. Optical data packets $A_2$ and C instruct routing device 408 to switch optical power packets $A_2$ and C through branches 406a and 406c to receiving devices 410a and 410c, respectively.

Figure 5:
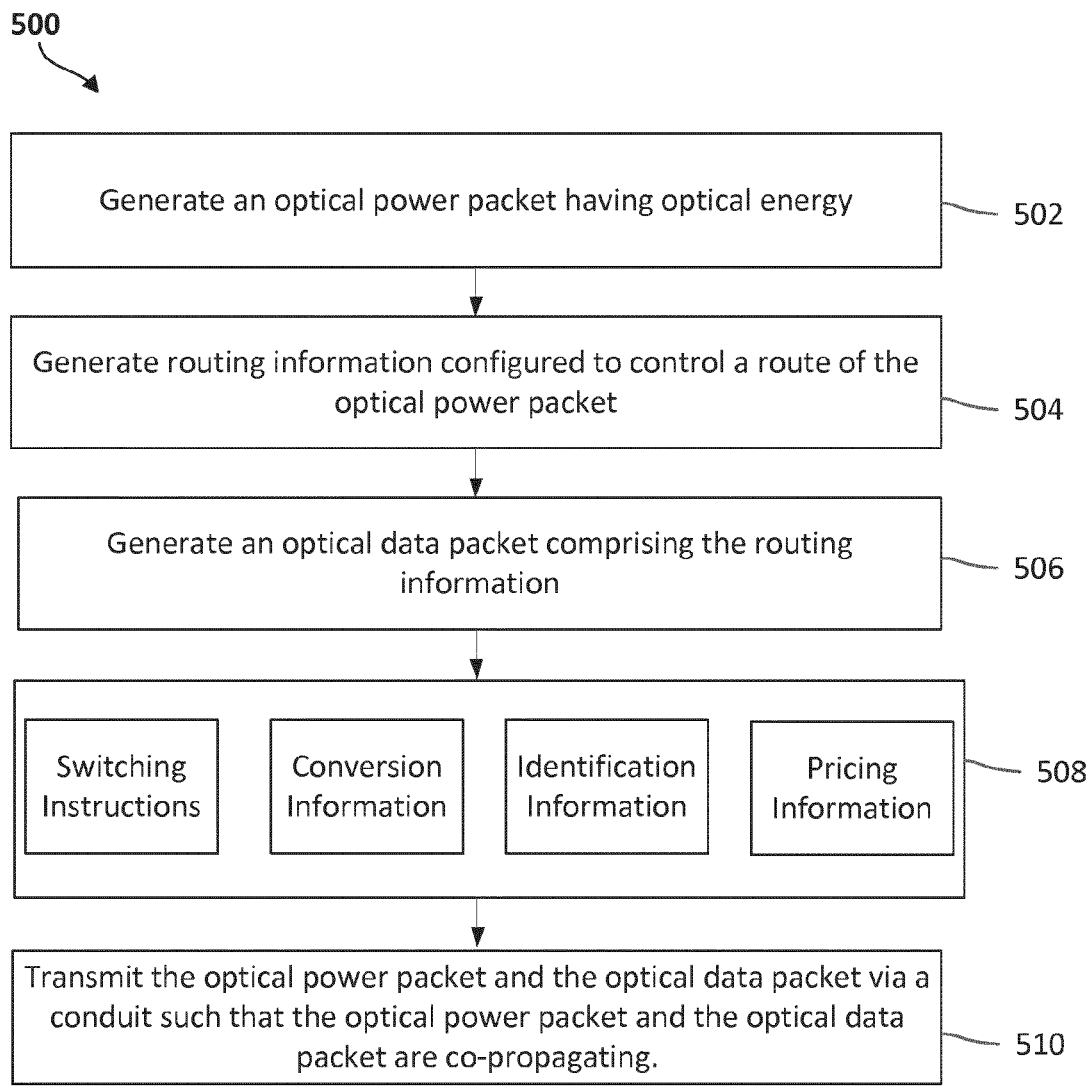
FIG. 5 is a flowchart of a process for transmitting routable energy packets according to one embodiment.

Referring to FIG. 5, a flow diagram of a process 500 for transmitting routable energy packets is shown, according to one embodiment. In alternative embodiments, fewer, additional, and/or different actions may be performed. Also, the use of a flow diagram is not meant to be limiting with respect to the order of actions performed. At least one optical power packet having optical energy is generated by controlling an optical power source (502). The optical power source may be any optical power source as described herein. Routing information configured to control a route of the optical power packet is generated (504) and at least one optical data packet is generated to transmit the routing information (506). The routing information may include various types of information, and may be configured to control the routing of a single optical power packet, or multiple optical power packets. For example, the routing information may include switching instructions, power conversion information, power identification information, source/destination identification information, and/or pricing information (508). The optical power packet and the optical data packet are transmitted via a conduit such that the optical power packet and the optical data packet are co-propagating (510). The conduit may include portions of optical fiber, free space, etc.

Figure 6:
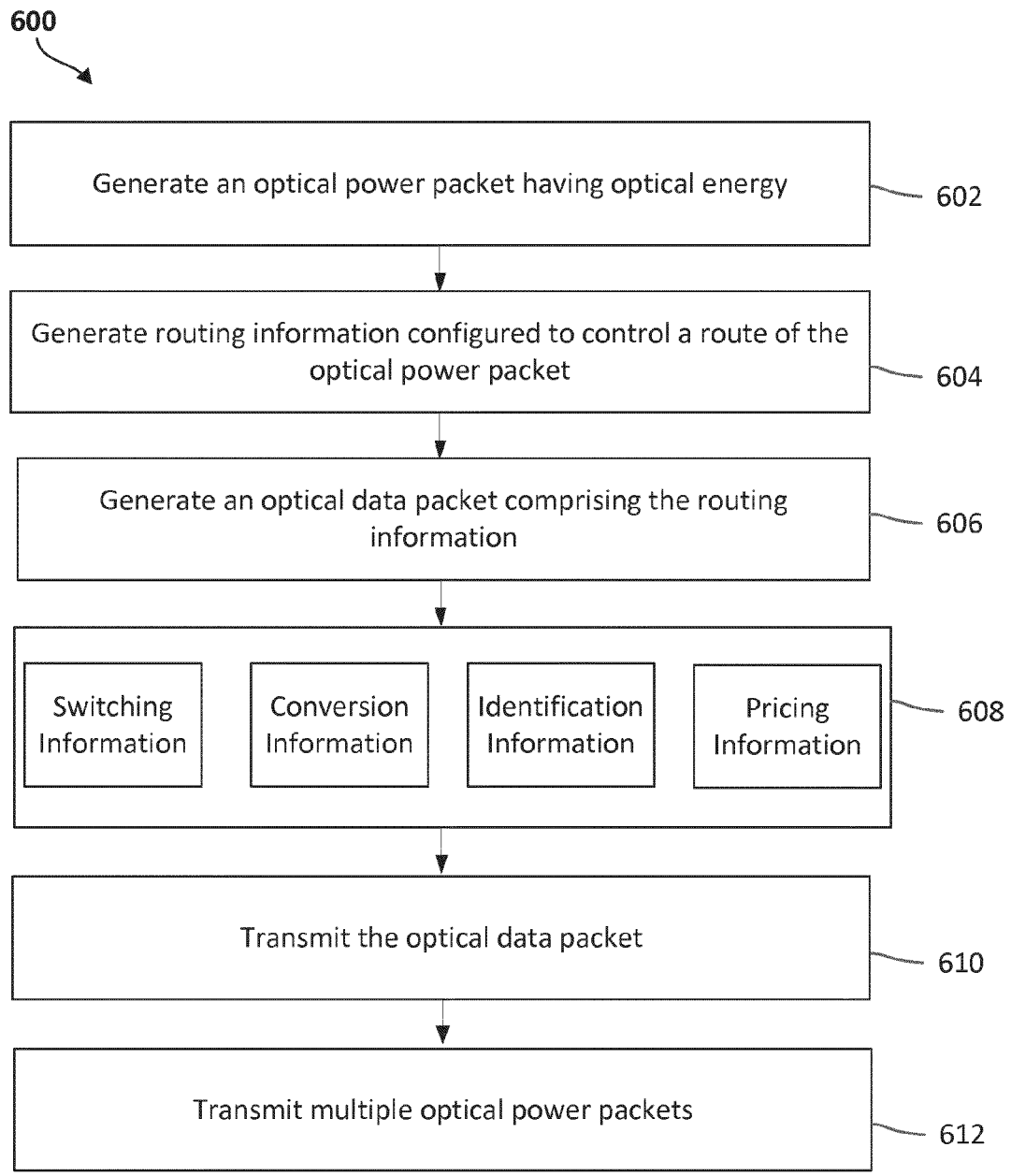
FIG. 6 is a flowchart of a process for transmitting routable energy packets according to one embodiment.

Referring to FIG. 6, a flow diagram of a process 600 for transmitting routable energy packets is shown, according to one embodiment. In alternative embodiments, fewer, additional, and/or different actions may be performed. Also, the use of a flow diagram is not meant to be limiting with respect to the order of actions performed. At least one optical power packet having optical energy is generated by controlling an optical power source (602). The optical power source may be any optical power source as described herein. Routing information configured to control a route of the optical power packet is generated (604) and at least one optical data packet is generated to transmit the routing information (606). The routing information may include various types of information (e.g., switching instructions, power conversion information, power identification information, source/destination identification information, and/or pricing information, etc.) (608). The optical data packet is transmitted (610) and then multiple optical power packets are transmitted (612). The optical data packet is configured to control the routing of the multiple optical power packets. For example, one optical data packet may be transmitted for N optical power packets.

Figure 7:
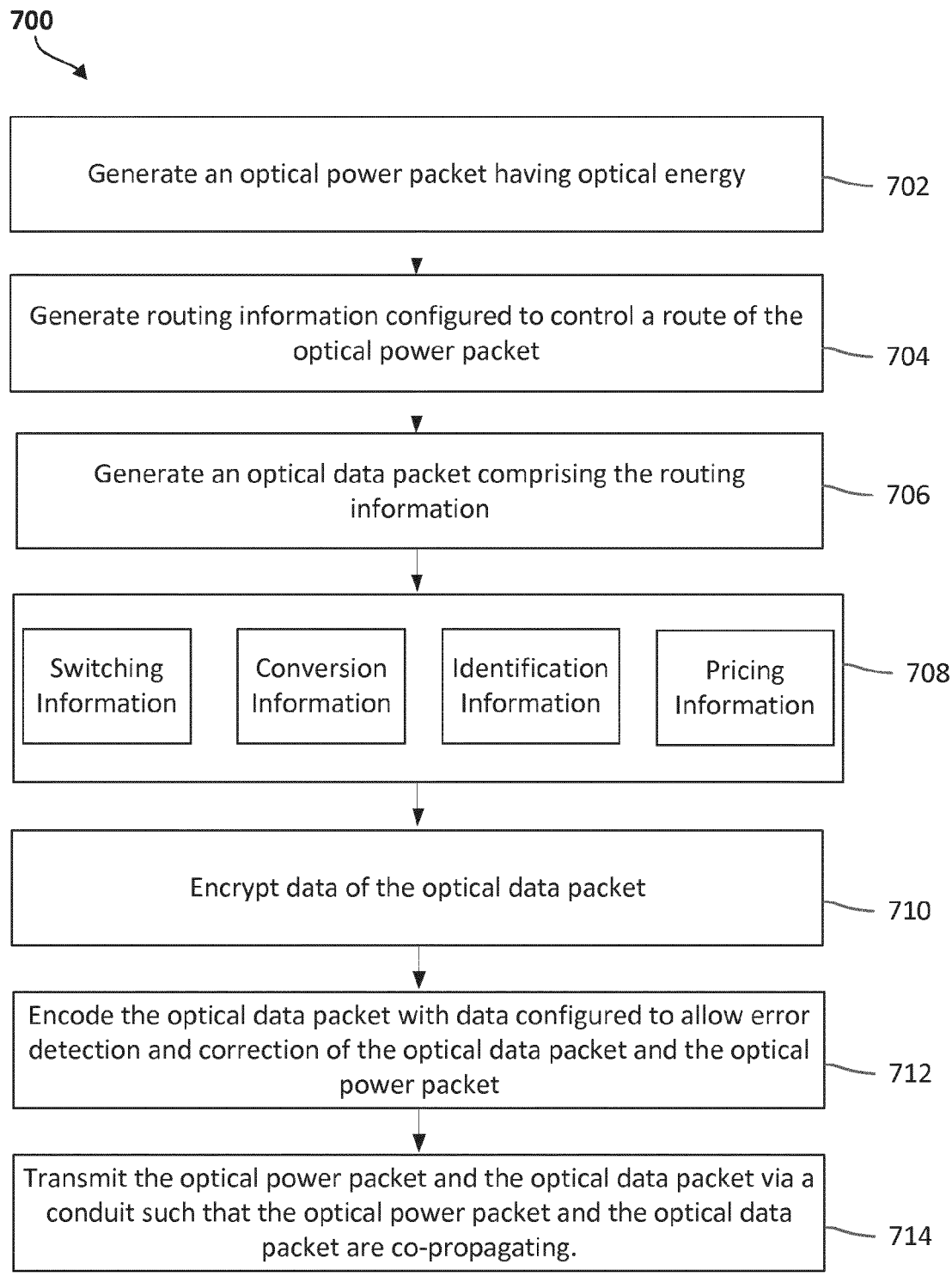
FIG. 7 is a flowchart of a process for transmitting routable energy packets according to one embodiment.

Referring to FIG. 7, a flow diagram of a process 700 for transmitting routable energy packets is shown, according to one embodiment. In alternative embodiments, fewer, additional, and/or different actions may be performed. Also, the use of a flow diagram is not meant to be limiting with respect to the order of actions performed. At least one optical power packet having optical energy is generated by controlling an optical power source (702). The optical power source may be any optical power source as described herein. Routing information configured to control a route of the optical power packet is generated (704) and at least one optical data packet is generated to transmit the routing information (706). The routing information may include various types of information (e.g., switching instructions, power conversion information, power identification information, source/destination identification information, and/or pricing information, etc.) (708). Individual portions of the optical data packet may be encrypted, or the entire optical data packet may be encrypted (710). Additionally, the optical data packet may be encoded with data configured to facilitate error detection and correction mechanisms in receiving devices or intermediate network nodes (e.g., routers, switches, etc.) (712). The optical power packet and the optical data packet are transmitted via a conduit such that the optical power packet and the optical data packet are co-propagating (714).

Figure 8:
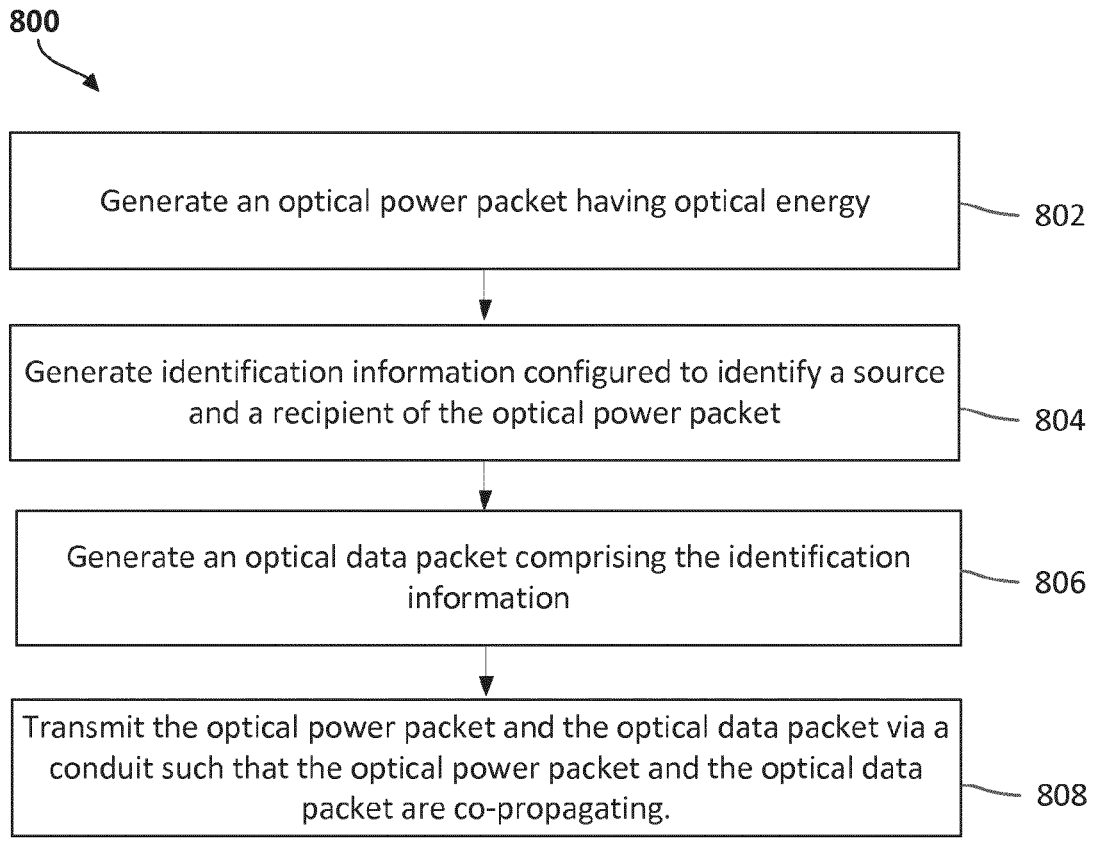
FIG. 8 is a flowchart of a process for transmitting routable energy packets according to one embodiment.

Referring to FIG. 8, a flow diagram of a process 800 for transmitting routable energy packets is shown, according to one embodiment. In alternative embodiments, fewer, additional, and/or different actions may be performed. Also, the use of a flow diagram is not meant to be limiting with respect to the order of actions performed. At least one optical power packet having optical energy is generated by controlling an optical power source (802). The optical power source may be any optical power source as described herein. Identification information that identifies a source and at least one recipient of the optical power packet is generated (804) and at least one optical data packet is generated to transmit the identification information (806). The identification information may include various types of information, and may include pricing information and an entity to be paid for delivery of the optical power. The optical power packet and the optical data packet are transmitted via a conduit such that the optical power packet and the optical data packet are co-propagating (808). The conduit may include portions of optical fiber, free space, etc.

Figure 9:
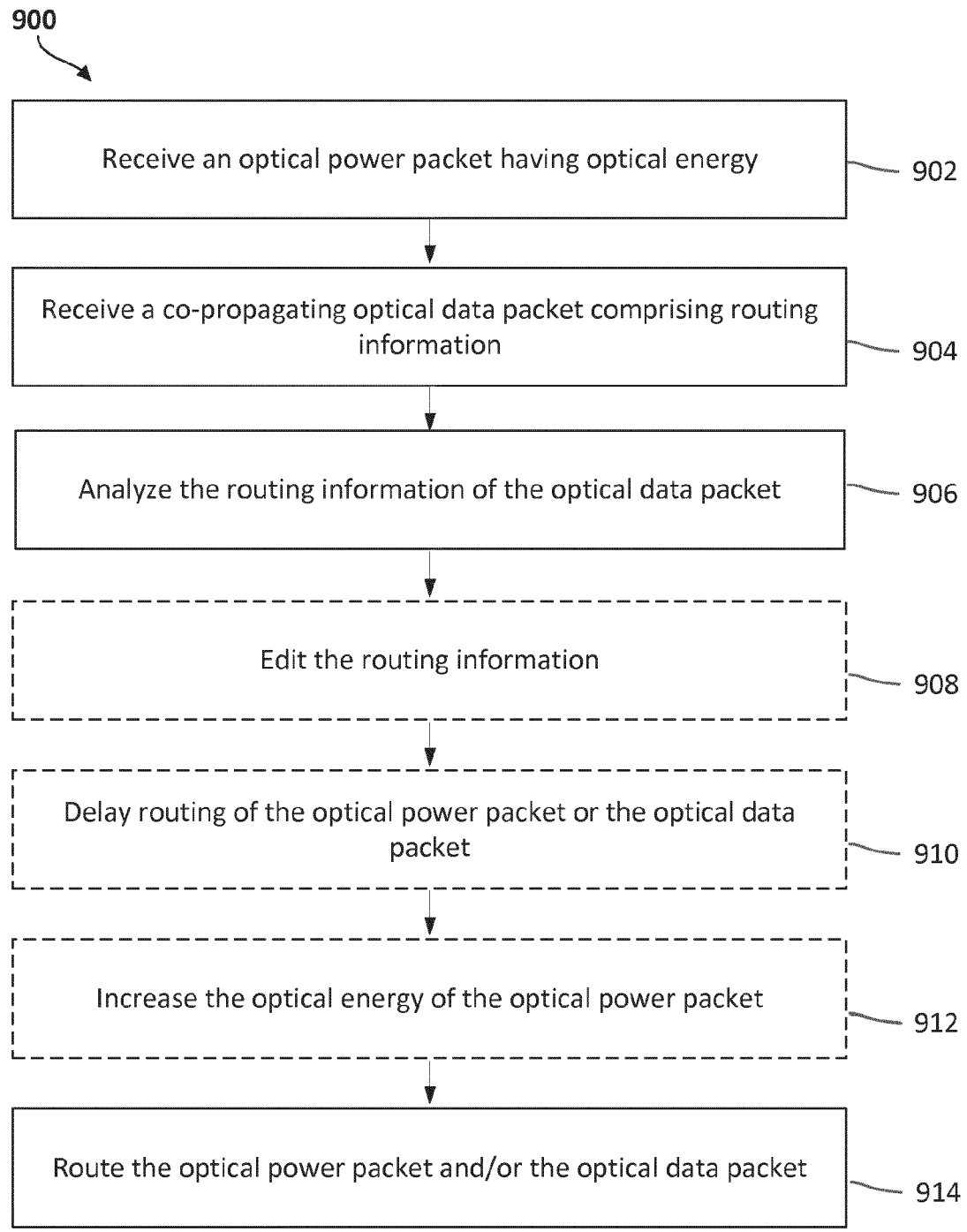
FIG. 9 is a flowchart of a process for routing energy packets according to one embodiment.

Referring to FIG. 9, a flow diagram of a process 900 for routing energy packets is shown, according to one embodiment. In alternative embodiments, fewer, additional, and/or different actions may be performed. Also, the use of a flow diagram is not meant to be limiting with respect to the order of actions performed. At least one optical power packet having optical energy is received by a router device (902), and at least one co-propagating optical data packet comprising routing information is received by the router device (904). The routing information is analyzed to determine routing instructions for the router device (906). The router device may edit the routing information of the optical data packet (908) such that the optical power packet and/or optical data packet are transmitted to a destination that is different than what is originally specified in the routing information. The router device may also delay routing (i.e. retransmission) of the optical power packet and/or optical data packet using an optical storage device (910). The router device may also increase the optical energy of the optical power packet. For example, the energy may be increase in order to compensate for an energy loss of the optical power packet, or the energy increase may be directed by the routing information (912). The optical power packet and/or the optical data packet are routed by the router device (i.e., transmitted using a conduit), based on the routing information (914). The conduit may include portions of optical fiber, free space, etc.

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-readable medium having instructions stored thereon, that when executed by a computing device cause the computing device to perform operations for transmitting routable energy packets, the operations comprising:
    generating, with an optical power source, an optical power packet having optical energy;
    generating routing information configured to control a route of the optical power packet;
    generating an optical data packet comprising the routing information; and
    transmitting the optical power packet and the optical data packet via a conduit such that the optical power packet and the optical data packet are co-propagating;
    wherein the operations further comprise encrypting data of the optical data packet.

2. The non-transitory computer-readable medium of claim 1, wherein the operations further comprise controlling the route of the optical power packet based on the routing information of the optical data packet.

3. The non-transitory computer-readable medium of claim 1, wherein the routing information includes a destination address.

4. The non-transitory computer-readable medium of claim 1, wherein the optical data packet is transmitted before the optical power packet.

5. The non-transitory computer-readable medium of claim 1, wherein the optical data packet is transmitted after the optical power packet.

6. The non-transitory computer-readable medium of claim 1, wherein the optical power packet comprises a soliton.

7. The non-transitory computer-readable medium of claim 1, wherein the optical data packet comprises a soliton.

8. The non-transitory computer-readable medium of claim 1, wherein the conduit comprises optical fiber.

9. The non-transitory computer-readable medium of claim 1, wherein the conduit comprises free-space.

10. The non-transitory computer-readable medium of claim 1, wherein the conduit comprises a portion of optical fiber and a portion of free-space.

11. A non-transitory computer-readable medium having instructions stored thereon, that when executed by a computing device cause the computing device to perform operations for transmitting routable energy packets, the operations comprising:
    generating, with an optical power source, an optical power packet having optical energy;
    generating routing information configured to control a route of the optical power packet;
    generating an optical data packet comprising the routing information; and
    transmitting the optical power packet and the optical data packet via a conduit such that the optical power packet and the optical data packet are co-propagating;
    wherein the operations further comprise encoding the optical data packet with data configured to enable error detection with respect to at least one of the optical data packet and the optical power packet.

12. The non-transitory computer-readable medium of claim 11, wherein the operations further comprise encrypting data of the optical data packet.

13. A non-transitory computer-readable medium having instructions stored thereon, that when executed by a computing device cause the computing device to perform operations for transmitting routable energy packets, the operations comprising:
    generating, with an optical power source, an optical power packet having optical energy;
    generating routing information configured to control a route of the optical power packet;
    generating an optical data packet comprising the routing information; and
    transmitting the optical power packet and the optical data packet via a conduit such that the optical power packet and the optical data packet are co-propagating;
    wherein the operations further comprise encoding the optical data packet with data configured to enable correction of at least one of the optical data packet and the optical power packet.

14. The non-transitory computer-readable medium of claim 13, wherein the operations further comprise encrypting data of the optical data packet.

15. A non-transitory computer-readable medium having instructions stored thereon, that when executed by a computing device cause the computing device to perform operations for transmitting routable energy packets, the operations comprising:
    generating, with an optical power source, an optical power packet having optical energy;

generating identification information identifying a source and a recipient of the optical power packet;
generating an optical data packet comprising identification information; and
transmitting the optical power packet and the optical data packet via a conduit such that the optical power packet and the optical data packet are co-propagating;
wherein the optical data packet is configured to support a plurality of optical power packets.

16. The non-transitory computer-readable medium of claim 15, wherein the operations further comprise identifying at least one of the source and the recipient of the optical power packet based on the identification information of the optical data packet.

17. The non-transitory computer-readable medium of claim 15, wherein the optical data packet is transmitted before the optical power packet.

18. The non-transitory computer-readable medium of claim 15, wherein the optical data packet is transmitted after the optical power packet.

19. The non-transitory computer-readable medium of claim 15, wherein the optical power packet comprises a soliton.

20. The non-transitory computer-readable medium of claim 15, wherein the optical data packet comprises a soliton.

21. The non-transitory computer-readable medium of claim 15, wherein the conduit comprises optical fiber.

22. The non-transitory computer-readable medium of claim 15, wherein the conduit comprises free-space.

23. The non-transitory computer-readable medium of claim 15, wherein the conduit comprises a portion of optical fiber and a portion of free-space.

24. The non-transitory computer-readable medium of claim 15, wherein the operations further comprise encrypting data of the optical data packet.

25. A non-transitory computer-readable medium having instructions stored thereon, that when executed by a computing device cause the computing device to perform operations for transmitting routable energy packets, the operations comprising:
generating, with an optical power source, an optical power packet having optical energy;
generating identification information identifying a source and a recipient of the optical power packet;
generating an optical data packet comprising identification information; and transmitting the optical power packet and the optical data packet via a conduit such that the optical power packet and the optical data packet are co-propagating;
wherein the operations further comprise identifying at least one of the source and the recipient of the optical power packet based on the identification information of the optical data packet.

26. A non-transitory computer-readable medium having instructions stored thereon, that when executed by a computing device cause the computing device to perform operations for transmitting routable energy packets, the operations comprising:
generating, with an optical power source, an optical power packet having optical energy;
generating identification information identifying a source and a recipient of the optical power packet;
generating an optical data packet comprising identification information; and
transmitting the optical power packet and the optical data packet via a conduit such that the optical power packet and the optical data packet are co-propagating;
wherein the operations further comprise encoding the optical data packet within the optical power packet.

27. The non-transitory computer-readable medium of claim 26, wherein the optical data packet is configured to support a plurality of optical power packets.

28. A non-transitory computer-readable medium having instructions stored thereon, that when executed by a computing device cause the computing device to perform operations for transmitting routable energy packets, the operations comprising:
generating, with an optical power source, an optical power packet having optical energy;
generating identification information identifying a source and a recipient of the optical power packet;
generating an optical data packet comprising identification information; and
transmitting the optical power packet and the optical data packet via a conduit such that the optical power packet and the optical data packet are co-propagating;
wherein the identification information is further configured to identify a number of optical power packets supported by the optical data packet.

29. A non-transitory computer-readable medium having instructions stored thereon, that when executed by a computing device cause the computing device to perform operations for transmitting routable energy packets, the operations comprising:
generating, with an optical power source, an optical power packet having optical energy;
generating identification information identifying a source and a recipient of the optical power packet;
generating an optical data packet comprising identification information; and
transmitting the optical power packet and the optical data packet via a conduit such that the optical power packet and the optical data packet are co-propagating;
wherein the operations further comprise encrypting data of the optical data packet.

30. A non-transitory computer-readable medium having instructions stored thereon, that when executed by a computing device cause the computing device to perform operations for transmitting routable energy packets, the operations comprising:
generating, with an optical power source, an optical power packet having optical energy;
generating identification information identifying a source and a recipient of the optical power packet;
generating an optical data packet comprising identification information; and
transmitting the optical power packet and the optical data packet via a conduit such that the optical power packet and the optical data packet are co-propagating;
wherein the operations further comprise encoding the optical data packet with data configured to enable error detection with respect to at least one of the optical data packet and the optical power packet.

31. A non-transitory computer-readable medium having instructions stored thereon, that when executed by a computing device cause the computing device to perform operations for transmitting routable energy packets, the operations comprising:
generating, with an optical power source, an optical power packet having optical energy;

generating identification information identifying a source and a recipient of the optical power packet;
generating an optical data packet comprising identification information; and
transmitting the optical power packet and the optical data packet via a conduit such that the optical power packet and the optical data packet are co-propagating;
wherein the operations further comprise encoding the optical data packet with data configured to enable correction of at least one of the optical data packet and the optical power packet.

32. A non-transitory computer-readable medium having instructions stored thereon, that when executed by a computing device cause the computing device to perform operations for routing energy packets, the operations comprising:
analyzing routing information of a received optical data packet, wherein the optical data packet comprises the routing information, and wherein the optical data packet was received by a router device; and
routing, using the router device, an optical power packet having optical energy, wherein the optical power packet was co-propagating with the optical data packet and received by the router device, and wherein the optical power packet is routed based on the routing information;
wherein routing the optical data packet includes transmitting the optical data packet to an address specified in the routing information.

33. The non-transitory computer-readable medium of claim 32, wherein the operations further comprise transmitting at least one of the optical power packet and the optical data packet to an optical storage device to delay further routing of at least one of the optical power packet and the optical data packet.

34. A non-transitory computer-readable medium having instructions stored thereon, that when executed by a computing device cause the computing device to perform operations for routing energy packets, the operations comprising:
analyzing routing information of a received optical data packet, wherein the optical data packet comprises the routing information, and wherein the optical data packet was received by a router device; and
routing, using the router device, an optical power packet having optical energy, wherein the optical power packet was co-propagating with the optical data packet and received by the router device, and wherein the optical power packet is routed based on the routing information;
wherein at least one of the optical power packet and the optical data packet is routed to an address that is different from an address specified in the routing information.

35. A non-transitory computer-readable medium having instructions stored thereon, that when executed by a computing device cause the computing device to perform operations for routing energy packets, the operations comprising:
analyzing routing information of a received optical data packet, wherein the optical data packet comprises the routing information, and wherein the optical data packet was received by a router device; and
routing, using the router device, an optical power packet having optical energy, wherein the optical power packet was co-propagating with the optical data packet and received by the router device, and wherein the optical power packet is routed based on the routing information;
wherein the operations further comprise transmitting at least one of the optical power packet and the optical data packet to an optical storage device to delay further routing of at least one of the optical power packet and the optical data packet.

* * * * *